United States Patent
Fu et al.

(10) Patent No.: US 10,573,471 B2
(45) Date of Patent: Feb. 25, 2020

(54) SYSTEM FOR ELECTRIC LOAD CONTROLLING USING SMART THREE-WAY SWITCHES

(71) Applicant: TP-Link Research America Corp., San Jose, CA (US)

(72) Inventors: David Haidong Fu, San Jose, CA (US); Yajun Zhang, San Jose, CA (US)

(73) Assignee: TP-Link Research America Corp., San Jose, CA (US)

( * ) Notice: Subject to any disclaimer, the term of this patent is extended or adjusted under 35 U.S.C. 154(b) by 296 days.

(21) Appl. No.: 15/689,812

(22) Filed: Aug. 29, 2017

(65) Prior Publication Data

US 2019/0066942 A1   Feb. 28, 2019

(51) Int. Cl.
| | |
|---|---|
| H01H 9/54 | (2006.01) |
| H02M 7/06 | (2006.01) |
| G06F 1/30 | (2006.01) |
| H01H 89/00 | (2006.01) |
| H01H 50/54 | (2006.01) |
| H02J 3/00 | (2006.01) |

(52) U.S. Cl.
CPC ............. *H01H 9/54* (2013.01); *G06F 1/305* (2013.01); *H01H 89/00* (2013.01); *H02M 7/06* (2013.01); *H01H 50/54* (2013.01); *H01H 2300/03* (2013.01); *H02J 3/005* (2013.01)

(58) Field of Classification Search
CPC .......... H01H 9/00; H01H 50/00; H01H 89/00; H02M 7/00; G06F 1/00

USPC ......................................................... 307/24
See application file for complete search history.

(56) References Cited

U.S. PATENT DOCUMENTS

| | | | |
|---|---|---|---|
| 7,767,905 B2 | 8/2010 | Meyer | |
| 7,772,724 B2 | 8/2010 | Mosebrook et al. | |
| 7,791,282 B2 | 9/2010 | Yu et al. | |
| 8,373,313 B2 | 2/2013 | Garcia et al. | |
| 8,643,220 B1 | 2/2014 | Bhosale et al. | |
| 8,853,893 B2 | 10/2014 | Savicki, Jr. et al. | |
| 9,184,590 B2 | 11/2015 | Testani | |
| 9,384,915 B2 | 7/2016 | Cecchetti et al. | |
| 2009/0103228 A1* | 4/2009 | Elderbaum | H01H 9/167 361/187 |
| 2010/0278537 A1 | 11/2010 | Elberbaum | |
| 2011/0141647 A1* | 6/2011 | Garcia | H01H 23/145 361/166 |
| 2016/0216700 A1 | 7/2016 | Fan et al. | |

(Continued)

*Primary Examiner* — Rexford N Barnie
*Assistant Examiner* — Joseph N Inge (57) ABSTRACT

A circuit for controlling electric load(s) includes two smart switches connected in a three-way circuit configuration. Each of the two smart switches includes a first and second input terminals configured to receive an AC power. The switch also includes a first and second output terminals configured to provide the AC power to an electric load, and further includes a relay configured to selectively couple the first input terminal to the first output terminal or the second output terminal, and a controller configured to control the coupling of the relay. The switch includes a first AC/DC converter and a second AC/DC converter. The first and second AC/DC converters are configured to selectively receive the AC power from the corresponding first or second output terminal that is selectively coupled with the first input terminal and to provide a DC power to the controller.

14 Claims, 4 Drawing Sheets

(56) References Cited

U.S. PATENT DOCUMENTS

2017/0064850 A1  3/2017  Blase et al.
2018/0219468 A1* 8/2018  Venkataramanan .... H02M 1/14

* cited by examiner

SYSTEM FOR ELECTRIC LOAD CONTROLLING USING SMART THREE-WAY SWITCHES

FIELD

The present disclosure generally relates to systems for controlling electric load(s), more particularly to systems for controlling electric load(s) using smart three-way switches.

BACKGROUND

Most electric load controlling systems use two three-way mechanical switches to receive on and off inputs from any one of the switches. In a three-way switching arrangement, two single-pole double-throw (SPDT) switches have power at all times in one of the two legs.

Figure 1:
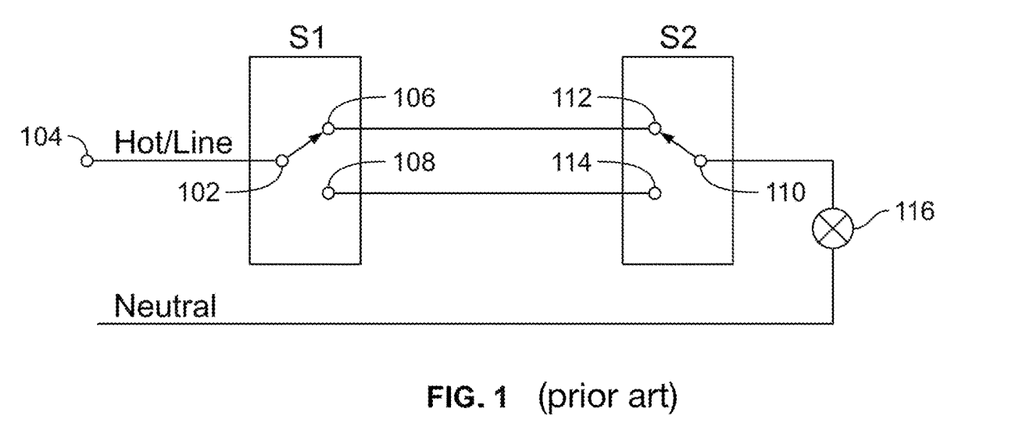
FIG. 1 is a diagram showing an electric circuit including conventional mechanical three-way switches.

A conventional mechanical three-way switch wiring 100 is illustrated by FIG. 1. The switches S1 and S2 are not wired in the same way from the view of connecting to the main AC wire. The SPDT switch S1 includes a pole 102 connected to a Hot terminal 104 all the time to receive power from an AC power source. The SPDT switch S2 includes a pole 106 connected to an electrical load 108 (e.g., a light bulb, etc.) to turn on or off the electrical load 108 depending on the states of the switches S1 and S2. The switch S2 does not always receive AC power due to different states of the two switches S1 and S2.

Most smart three-way switches currently on the market are using such wiring shown in FIG. 1, which requires identifying the Hot terminal of the AC power source and connecting the pole of one of the three-way switches to the identified Hot terminal all the time to ensure the internal circuitry to have power supply, which is selectively delivered to the connected electrical load. Hence, users often need to rely on "try and error" to figure out a correct Hot terminal to be connected to the wiring box, or need to hire a technician to install the three-way switches correctly, which is time consuming and costly.

Therefore, there is a need for a system for plugging in or hooking up three-way smart switches without identifying a Hot terminal of an AC power source.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A circuit includes two smart switches that are connected in a three-way circuit configuration, and each of the two smart switches includes a first input terminal, a second input terminal configured to receive an AC power. The switch also includes a first output terminal and a second output terminal configured to provide the AC power to an electric load. The switch further includes a relay configured to selectively couple the first input terminal to the first output terminal or the second output terminal, and a controller configured to control the coupling connection of the relay. Furthermore, the switch may include a first AC/DC converter coupled between the first output terminal and the controller, and a second AC/DC converter coupled between the second output terminal and the controller. The first AC/DC converter and the second AC/DC converter are configured to selectively receive the AC power from the corresponding first output terminal or the corresponding second output terminal that is selectively coupled with the first input terminal and to provide a DC power to the controller. The first output terminal and the second output terminal of the first three-way switch are swappably respectively coupled with the first input terminal and the second input terminal of the second three-way switch.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Several three-way switches have been developed for controlling electric load(s). However, traditionally it has been difficult to identify a Hot terminal of an AC power source and connect the pole of one of the three-way switches to the identified Hot terminal all the time to ensure the internal circuitry to have working power supply. The present disclosure presents a system for plugging in or hooking up three-way smart switches without identifying a Hot terminal of an AC power source. The present disclosure may allow swapping the Hot line input terminal and the load output terminal of the two three-way switches.

FIG. 1 is a diagram showing an electric circuit 100 including conventional mechanical three-way switches S1, S2.

The switches S1 and S2 are not wiring the same from the view of connecting to the main AC wire. The SPDT switch S1 includes a pole 102 connected to a Hot terminal 104 all the time to receive power from an AC power source, and a movable contact adapted to connect the pole 102 with one of the two throws 106, 108. The SPDT switch S2 also includes a pole 110 and a movable contact adapted to connect the pole 110 with one of the two throws 112, 114. The pole 110 connects to an electrical load 116 (e.g., a light bulb) and the two throws 112, 114 respectively connect with the two throws 106, 108 of S1. The electrical load 116 can be turned on and off depending on the states of the switches S1 and S2. For example, when the movable contacts of the switches S1, S2 are respectively making contacts with the two upper throws 106 and 112 (the state shown in FIG. 1) or with the two lower throws 108, 114, the circuit 100 delivers the AC power from the Hot terminal 104 to the electric load 116 and energizes the electric load 116. When one of the movable contacts is in contact with the corresponding upper throw and the other one of the movable contacts is in contact with the corresponding lower throw, the circuit 100 is not complete to deliver the AC power from the Hot terminal 104 to the electric load 116 and does not energize the electric load 116. As such, the load connecting to the switch S2 does not always receive AC power due to different states of the two switches S1, S2.

Accordingly, the traditional wiring requires identifying the Hot line terminal in order to connect the conventional mechanical three-way switches properly to allow the circuit to work properly.

Figure 2:
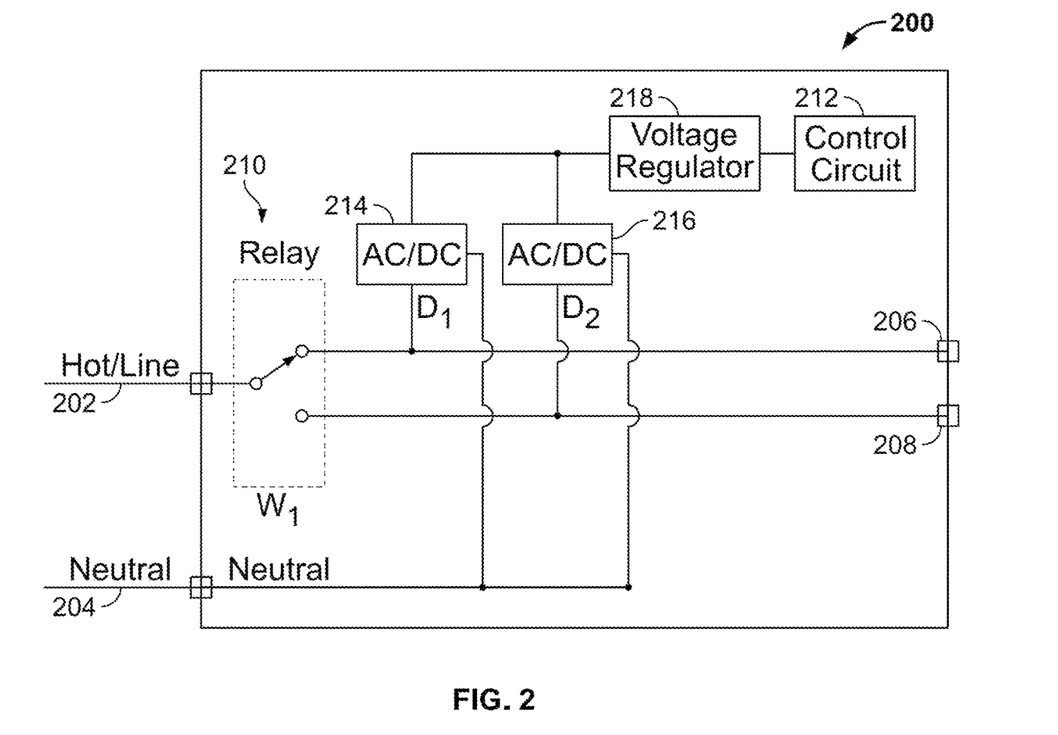
FIG. 2 is a block diagram showing an example smart three-way switch including a relay configuration according to the principles of the present disclosure.

FIG. 2 is a block diagram showing an example smart three-way switch 200 including a relay configuration. The switch 200 includes a first input terminal 202, a second input terminal 204, a first output terminal 206, and a second output terminal 208. The first input terminal 202 and the second input terminal 204 are respectively electrically connected to a Hot line terminal and a neutral of an AC power resource to receive an AC power. The first output terminal 206 and the second output terminal 208 are configured to provide the AC power to an electric load.

The smart three-way switch 200 may employ a relay 210 to selectively couple the first input terminal 202 to the first output terminal 206 or the second output terminal 208. The switch 200 may also include a controller 212 configured to control the coupling connection of the relay 210 (i.e., the controller 212 may select the connection from the first input terminal 202 to the first output terminal 206 or to the second output terminal 208).

The relay 210 may include a single-pole double-throw (SPDT) three-way switch W having a movable contact adapted to couple the first input terminal 202 with either the first output terminal 206 or the second output terminal 208. The movable contact may be manually controlled (e.g., having a manual button for switching between the two throws). Alternatively, the movable contact may be wirelessly controlled by an app installed on a remote smart device (e.g., an iPhone, an iPad, an Apple Watch, or Android smart devices, etc.). Additionally, the switch 200 may include one or more wireless communication component configured to be wirelessly controlled. The wireless communication component can be, for example, a Bluetooth transceiver, a Wi-Fi transceiver, a Zigbee transceiver, a Z-wave transceiver, or a 6LowPAN transceiver, etc.

Further, the switch 200 may include a first AC/DC converter 214 coupled between the first output terminal 206 and the controller 212, and a second AC/DC converter 216 coupled between the second output terminal 208 and the controller 212. Since the relay 210 is configured to electrically connect the first input terminal 202 to either the first output terminal 206 or the second output terminal 208, the AC power is thus supplied to either the first AC/DC converter 214 or the second AC/DC converter 216 to be converted into a DC power. As such, the controller 212 can be supplied with the DC operating power from either the first AC/DC converter 214 or the second AD/DC converter 216 regardless of the state of the relay 210. In other words, an uninterrupted power supply is received to allow the controller 212 to operate no matter whether the first output terminal 206 or the second output terminal 208 of the relay 210 is selected to be electrically coupled to the Hot line terminal.

Alternatively, the controller 212 may be a system on chip (SOC) controller that integrates a microcontroller or microprocessor with functional components (e.g., graphics processing unit (GPU), Wi-Fi module, or coprocessor, etc.).

Furthermore, the switch 200 may include a DC voltage regulator 218 configured to smooth the output DC voltage of the AC/DC converter 214, 216 and supply the DC power to the controller 212 for operating. For example, the DC voltage regulator 218 can maintain a substantially constant voltage level used by the controller 212.

Figure 3:
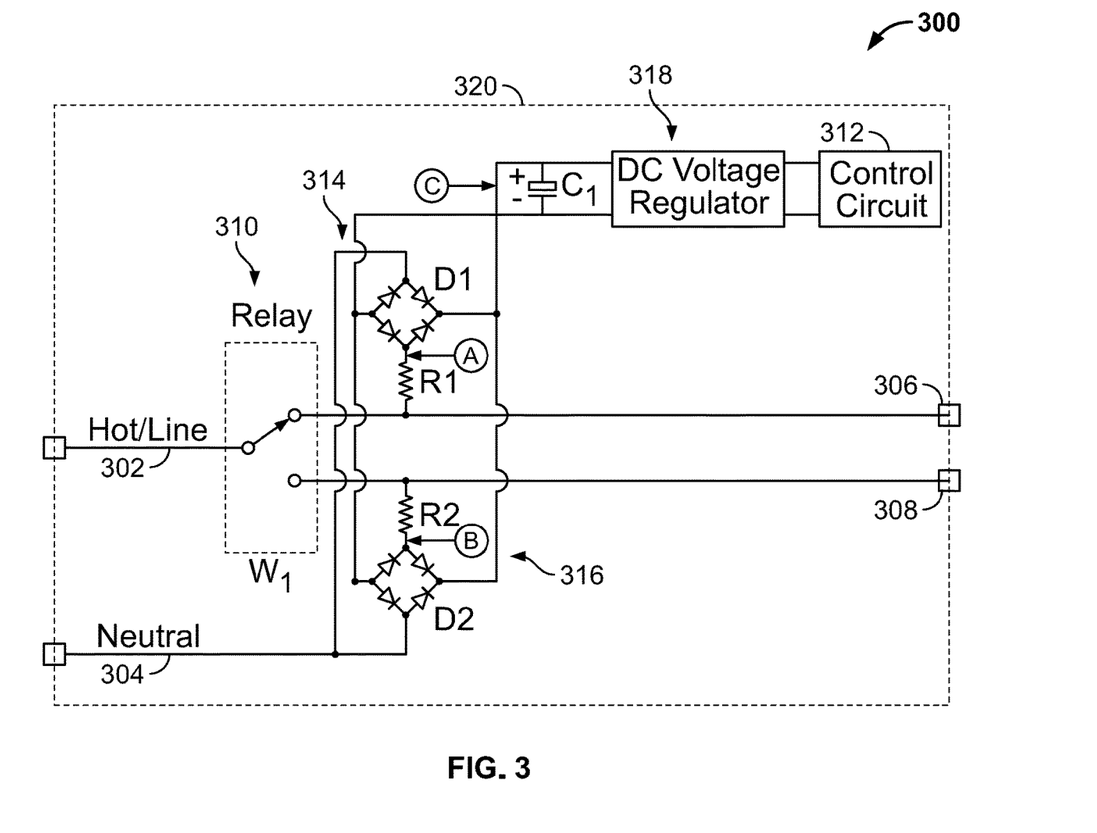
FIG. 3 is a circuitry diagram showing an example implementation of the smart three-way switch of FIG. 2 according to the principles of the present disclosure.

FIG. 3 is a circuitry diagram showing an example implementation circuit 300 of the smart three-way switch 200 of FIG. 2. The switch circuit 300 includes a first input terminal 302 a second input terminal 304 respectively electrically connected to a Hot line terminal and a neutral of an AC power resource to receive an AC power, a first output terminal 306 and a second output terminal 308 configured to provide the AC power to an electric load. The switch circuit 300 may include a relay 310 to selectively couple the first input terminal 302 to the first output terminal 306 or the second output terminal 308. The switch circuit 300 may also include a controller 312 configured to control the coupling connection of the relay 310. Further, the switch circuit 300 may include a first AC/DC converter 314 coupled between the first output terminal 306 and the controller 312, and a second AC/DC converter 316 coupled between the second output terminal 308 and the controller 312. Furthermore, the switch circuit 300 may include a DC voltage regulator 318 configured to smooth the output DC voltage of the AC/DC converter 314, 316 and supply the DC power to the controller 312 for operating.

Additionally, the first AC/DC converter and the second AC/DC converter may each include a full wave rectifier circuit D1 and D2. The full wave rectifier circuits D1, D2 may be a diode bridge rectifier circuit. In the full wave rectifier circuits D1, D2, resistors R1 and R2 operate as fuses. For example, when one or more internal components fail to cause a circuit shortage, the resistors R1, R2 will be blown first to protect the circuit from power surge.

The diode rectifier bridges D1 and D2 convert both positive and negative half cycles of the input AC signal into pulsating DC signal by having two sets of diodes to respectively allow receiving input AC signals from either of the two sets of diodes. Thus, the rectifier efficiency of a full wave rectifier is twice that of the half wave rectifier. The full wave rectifier with higher efficiency can therefore handle more power consumption for the control circuit.

Additionally, the switch circuit may include a capacitor 320 configured to ensure uninterrupted DC power supply when the relay 310 switches between the coupling of the first input terminal 302 to the first output terminal 306 and the coupling of first input terminal 302 to the second output terminal 308. Specifically, the capacitor 320 is used to absorb and store energy when the AC power is higher than what is needed by the DC load (i.e., the controller 312) and to supply energy to the load when the AC power is lower than what is needed, including when the movable contact of the relay 310 is switching between the first output terminal 306 and the second output terminal 308 and during short open-circuit intervals (i.e., when the movable contact of the relay 310 is not connected with either the first output terminal 306 or the second output terminal 308. Further, the size of the capacitor 320 (i.e., the capacitance) is selected based on how much power is required or needed by the DC load (i.e., the controller 312). The capacitor 320 may also help reducing the voltage ripples to provide the controller 312 a constant DC power.

Figure 4A:
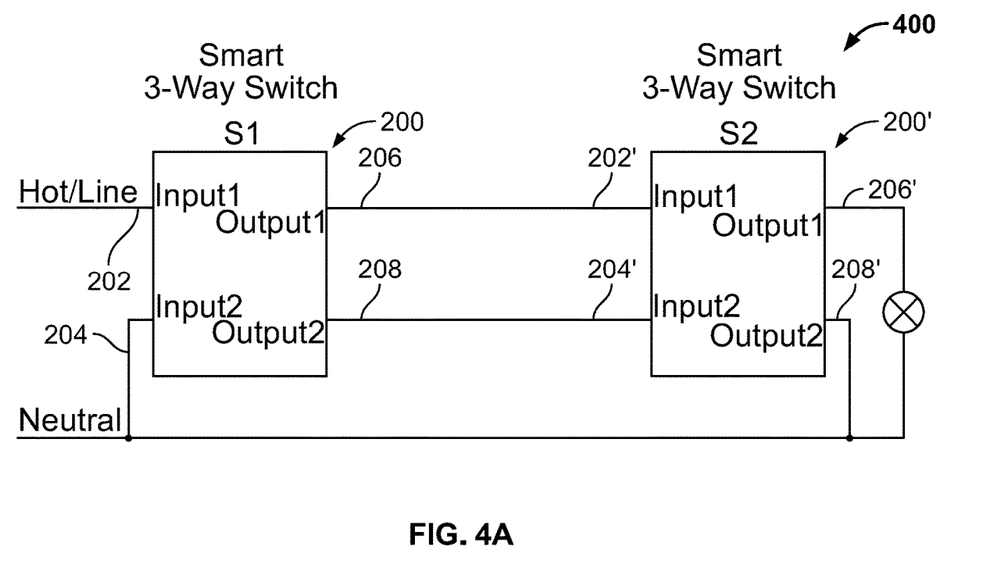
FIG. 4A is a block diagram showing an example circuit including two of the smart three-way switches of FIG. 2 according to the principles of the present disclosure.

FIG. 4A is a block diagram showing an example circuit 400 with the connections of two of the smart three-way switches 200, 200' of FIG. 2.

Figure 4B:
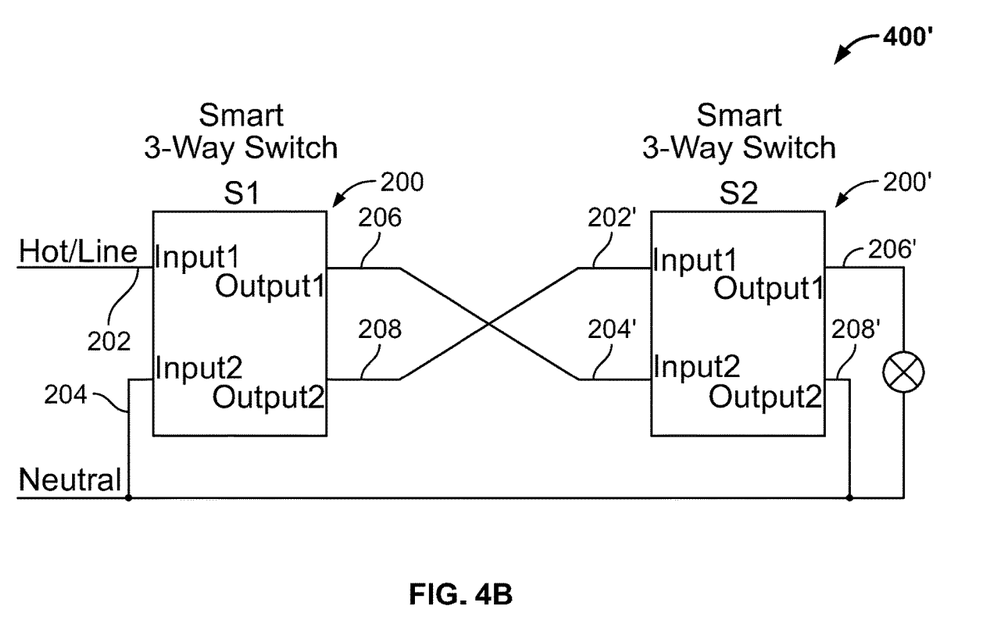
FIG. 4B is a block diagram showing another example circuit including two of the smart three-way switches of FIG. 2 according to the principles of the present disclosure.

FIG. 4B is a block diagram showing another example 400' circuit including two of the smart three-way switches 200, 200' of FIG. 2.

A circuit having a pair of three-way smart switches 200, 200' designed according to the present disclosure provides a pin-to-pin swappable connection without the need to identify the Hot line terminal wire connection. For example, as shown in FIGS. 4A and 4B, if connections for the first input terminals 202, 204 or 202', 204' are swapped, and/or the connections for the first output terminals 206, 208 or 206', 208 are swapped, internal controller for each of the three-way switches 200, 200' can always be supplied by a DC power supply because of the designs disclosed herein. As such, the two three-way smart switches 200, 200' can be plugged in without the need to guess/determine which terminal has to be connected to the Hot line terminal to ensure the switches are working properly. Accordingly, the smart switch design discussed herein allows the circuit to receive the AC power by either of the first three-way smart switch or the second three-way smart at any time and provides an uninterrupted DC operating power to the internal control circuit.

Figure 5:
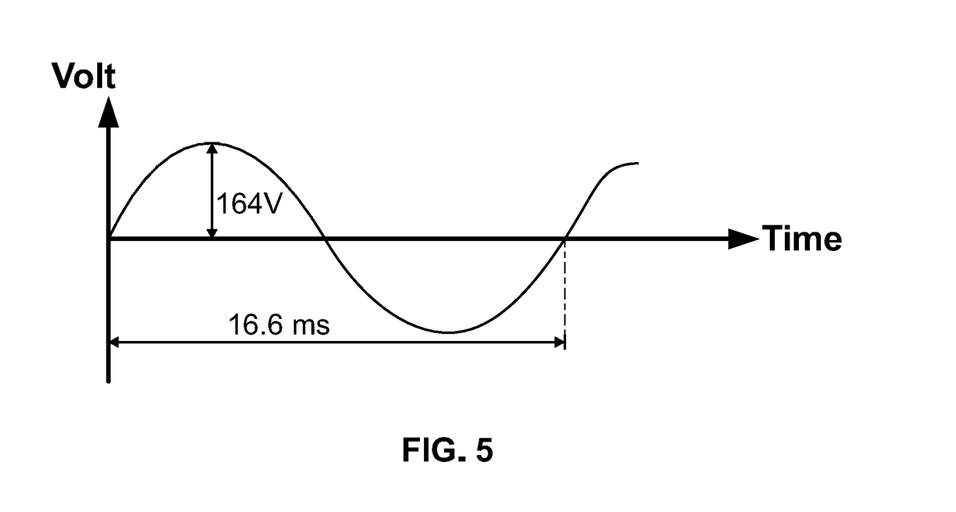
FIG. 5 illustrates voltage waveforms of point A or B of FIG. 3 according to the principles of the present disclosure.

FIG. 5 illustrates example voltage waveforms of point A or B of FIG. 3. As shown, the waveform at point A in the circuit 300 of FIG. 3 and the waveform at point B in the circuit 300 of FIG. 3 are substantially the same AC sine waveform with a peak value of 164V.

Figure 6:
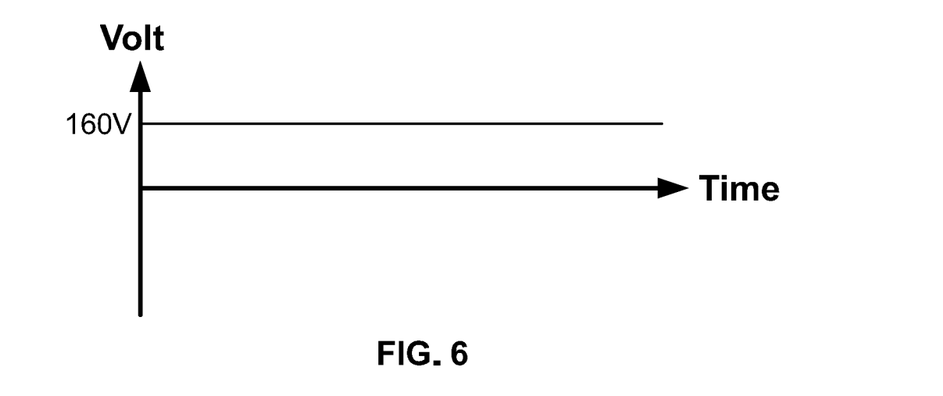
FIG. 6 illustrates a voltage waveform of point C of FIG. 3 according to the principles of the present disclosure.

FIG. 6 illustrates a voltage waveform of point C of FIG. 3. As shown, the waveform at point C in the circuit 300 of FIG. 3 is a DC waveform having a substantial constant of 160V.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A circuit comprising:
    a first three-way switch; and
    a second three-way switch,
    wherein the first three-way switch and the second three-way switch are connected in a three-way circuit configuration, and each of the first three-way switch and the second three-way switch includes:
        a first input terminal;
        a second input terminal, wherein the first input terminal and the second input terminal are configured to receive an AC power;
        a first output terminal;
        a second output terminal, wherein the first output terminal and the second output terminal are configured to provide the AC power to an electric load;
        a relay configured to selectively couple the first input terminal to the first output terminal or the second output terminal;
        a controller configured to control the coupling connection of the relay;
        a first AC/DC converter coupled between the first output terminal and the controller; and
        a second AC/DC converter coupled between the second output terminal and the controller,
    wherein the first AC/DC converter and the second AC/DC converter are configured to selectively receive the AC power from the corresponding first output terminal or the corresponding second output terminal that is selectively coupled with the first input terminal and to provide a DC power to the controller,
    wherein the first output terminal and the second output terminal of the first three-way switch are swappably coupled with the first input terminal and the second input terminal of the second three-way switch,
    wherein the first AC/DC converter and the second AC/DC converter each comprises a full wave rectifier circuit,
    wherein the full wave rectifier circuit comprises a diode bridge rectifier circuit, and
    wherein the circuit further comprises a DC voltage regulator configured to smooth the output DC voltage of the DC power that is supplied to the controller.

2. The circuit of claim 1, at least one of the first three-way switch and the second three-way switch further comprises a capacitor configured to ensure the DC power is uninterruptedly supplied when the relay switches between the coupling of the first input terminal to the first output terminal and the coupling of the first input terminal to the second output terminal.

3. The circuit of claim 1, wherein the controller is a system on chip controller.

4. The circuit of claim 1, wherein the relay includes a single-pole double-throw (SPDT) three-way switch comprising a movable contact adapted to couple the first input terminal with either the first output terminal or the second output terminal.

5. The circuit of claim 4, wherein the movable contact is manually controlled.

6. The circuit of claim 4, wherein the movable contact is wirelessly controlled by an app installed on a smart device.

7. The circuit of claim 6, wherein the circuit comprises at least one wireless communication component selected from a group consisting of: a Bluetooth transceiver, a WiFi transceiver, a Zigbee transceiver, a Z-wave transceiver, and a 6LowPAN transceiver.

8. A three-way smart switch comprising:
    a first input terminal;
    a second input terminal, wherein the first input terminal and the second input terminal are configured to receive an AC power;
    a first output terminal;
    a second output terminal, wherein the first output terminal and the second output terminal are configured to provide the AC power to an electric load;
    a relay configured to selectively couple the first input terminal to the first output terminal or the second output terminal;
    a controller configured to control the coupling connection of the relay;
    a first AC/DC converter coupled between the first output terminal and the controller; and
    a second AC/DC converter coupled between the second output terminal and the controller,
    wherein the first AC/DC converter and the second AC/DC converter are configured to selectively receive the AC power from the corresponding first output terminal or the corresponding second output terminal that is selectively coupled with the first input terminal and to provide a DC power to the controller,
    wherein at least one of the first AC/DC converter and the second AC/DC converter comprises a full wave rectifier circuit,
    wherein the full wave rectifier circuit comprises a diode bridge rectifier circuit, and
    wherein the three-way smart switch further comprises a DC voltage regulator configured to smooth the output DC voltage of the DC power that is supplied to the controller.

9. The three-way smart switch of claim 8, further comprising a capacitor configured to ensure the DC power is uninterruptedly supplied when the relay switches between the coupling of the first input terminal to the first output terminal and the coupling of the first input terminal to the second output terminal.

10. The three-way smart switch of claim 8, wherein the controller is a system on chip controller.

11. The three-way smart switch of claim 8, wherein the relay includes a single-pole double-throw (SPDT) three-way switch comprising a movable contact adapted to couple the first input terminal with either the first output terminal or the second output terminal.

12. The three-way smart switch of claim 11, wherein the movable contact is manually controlled.

13. The three-way smart switch of claim 11, wherein the movable contact is wirelessly controlled by an app installed on a smart device.

14. The three-way smart switch of claim 13, further comprising at least one wireless communication component selected from a group consisting of: a Bluetooth transceiver, a WiFi transceiver, a Zigbee transceiver, a Z-wave transceiver, and a 6LowPAN transceiver.

\* \* \* \* \*